United States Patent [19]
Sapp

[11] 3,924,345
[45] Dec. 9, 1975

[54] FISHING ROD WITH STORABLE STAKE
[76] Inventor: Maurice Sapp, 1425 S. Harrison Road, Grand Island, Nebr. 68801
[22] Filed: Feb. 20, 1974
[21] Appl. No.: 444,253

[52] U.S. Cl. .................. 43/21.2; 43/23; 248/156
[51] Int. Cl.² ........................................ A01K 97/10
[58] Field of Search .......... 43/21.2, 23; 248/38, 156

[56] References Cited
UNITED STATES PATENTS
| 1,175,352 | 3/1916 | Hand | 248/156 |
| 2,561,046 | 7/1951 | Brooks | 248/156 X |
| 2,665,866 | 1/1954 | Goldinger | 43/21.2 X |

FOREIGN PATENTS OR APPLICATIONS
| 461,805 | 12/1949 | Canada | 43/21.2 |

Primary Examiner—Louis G. Mancene
Assistant Examiner—Daniel J. Leach
Attorney, Agent, or Firm—Larson, Taylor & Hinds

[57] ABSTRACT

The handle of a fishing rod or the like is formed with a hollow bore extending from the free end for storage of an elongate rod stake. The stake, at its base end, is coupled to a mounting member which is formed with axially opposite coupling means for detachable coupling with the free end of the rod handle, such that the mounting member can be coupled to the handle with the stake extending into and stored in the hollow bore, or with the stake extending from the free end of the handle so as to be insertable into the ground. Preferably the coupling means comprise screw threads on the end of the handle, and corresponding axially opposite threaded portions on the mounting member.

1 Claim, 5 Drawing Figures

FISHING ROD WITH STORABLE STAKE

FIELD OF THE INVENTION

This invention relates to fishing apparatus, and particularly to fishing rods provided with support stakes for insertion into the ground. The particular improvement to which the invention is directed involves a storage capability of the stake in the rod handle, while retaining its ready availability for use by merely reversing its orientation.

BACKGROUND AND SUMMARY OF THE INVENTION

Many fisherman like to use more than one rod or pole at the same time, checking them from time to time. On many occasions, they like to leave one or more rods unattended, for relatively short times, or even over-night. For this purpose, various rod supports are well known in the art, and conventionally comprise some form of pointed member for insertion into the ground. These are frequently referred to as rod stakes, and, in the case of surf fishing apparatus, they are frequently referred to as sand spikes. Perhaps the majority of such stakes or spikes are in the form of separate items apart from the fishing rod, and it is not unusual for a fisherman, when changing locations or ending his fishing for the day, to very carefully pack up his equipment and take it with him, while forgetfully leaving the stake or spike inserted in the ground, to be remembered later at a time when it is not convenient to go back to retrieve the stake or stakes. Even when the stake is remembered, it comprises a separate item to be packed away in the tackle box.

Apart from the conventional separate sand spikes and the like, I am aware of various previous proposals for different forms of stakes or spikes, intended to increase convenience of use and minimize the possibility of loss. For instance, U.S. Pat. No. 1,914,500 (Groschup) discloses a spike which is screw threaded at one end so as to fit a correspondingly threaded portion in the base of the fishing rod handle. When unscrewed and detached, the spike is a separate device, and is not storable in the rod handle. U.S. Pat. No. 2,241,183 (Ceder) discloses a spike which is axially retractable into and withdrawable from a bore in the handle of the fishing rod, but the device is relatively complex, and presumably expensive to manufacture. However, the spike is movable completely into the handle during nonuse. U.S. Pat. No. 2,628,445 (Lawrenz) discloses an axially retractable spike, primarily for an ice fishing arrangement, retraction and extension of the spike being accomplished through a slidable handle. Finally, U.S. Pat. No. 2,665,866 (Goldinger) discloses a nestable spike which is pivotally mounted in the handle of a fishing rod. My invention proposes a different form of handle-storable spike which I consider to constitute an improvement over the known devices.

In accordance with my invention, the stake, when not in use, is stored in a hollow bore in the rod handle, opening from the free end of the handle. The stake is provided at its base end with a mounting member which is formed with axially opposite coupling means for detachable coupling with the free end of the elongate handle in axially opposite orientations, such that the mounting member can be coupled to the free end of the handle with the stake extending into and stored in the hollow bore, or with the stake extending from the free end of the handle so as to be insertable into the ground. Preferably the coupling arrangement includes a screw threaded portion at the handle base, and axially opposite threaded portions on the mounting member for screw engagement with the threaded portion of the handle. The diameter and cross section of the mounting member preferably are such that it mates smoothly with the handle when mounted thereon, in either of the two positions. To use the device, in keeping with the preferred embodiment, it is only necessary to simply unscrew the mounting member, pull out the stake, reverse it, and screw it back on the handle in an opposite orientation. An optional feature of my invention includes a pivot joint in the stake itself to permit selective pivoting of the pointed end of the stake to a desired angle relative to the stake portion on the other side of the pivot joint, to facilitate supporting the rod at a desired angle, or to serve as an anchor for the rod when lying on the ground.

Other and further objects, features and advantages of my invention will be apparent from the ensuing description of preferred embodiments, taken in conjunction with the accompanying drawings.

DESCRIPTION OF THE PREFERRED EMBODIMENTS

Figure 1:
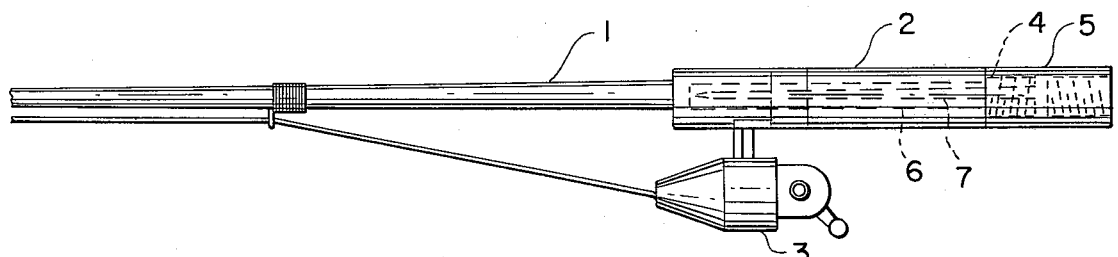
FIG. 1 shows, in part, a rod in accordance with the invention, with a reel mounted thereon.
Figure 2:
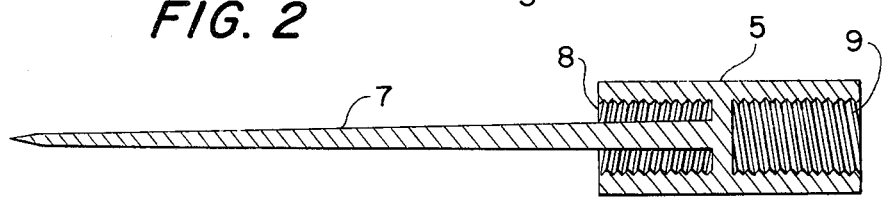
FIG. 2 is a sectioned view of a stake and its mounting member, in accordance with the invention.
Figure 4:
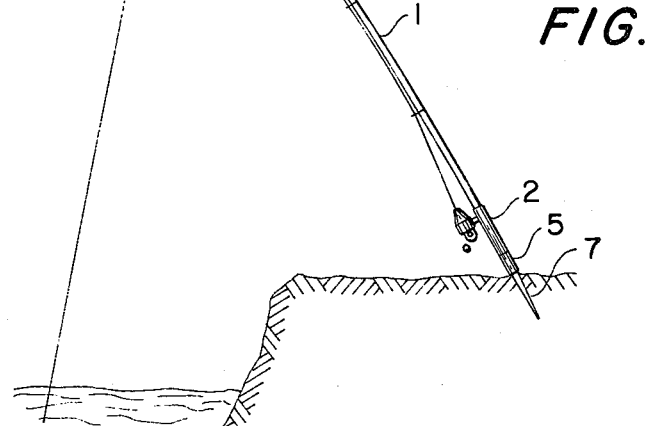
FIG. 4 shows a reel and rod supported by a stake in accordance with the invention.

Referring to the drawing, a conventional fishing rod 1 has a conventional reel 3 mounted on rod handle 2 in any suitable conventional manner. Handle 2 is formed with a hollow bore 6 extending from its base end (the right hand end as viewed in FIG. 1), which base end terminates in a threaded portion 4 of reduced diameter, the hollow bore 6 opening at the threaded end of portion 4. A mounting member 5, which constitutes a smooth continuation of handle 2, is formed with axially opposite aligned threaded bores 8 and 9, from one of which a rod stake 7 extends. As shown in FIG. 2, rod stake 7 has a pointed end and a base end, the base end being fixed to a transverse wall of mounting member 5 separating threaded bores 8 and 9. Bores 8 and 9 are threaded so as to mate with threaded portion 4 of handle 2. As shown in FIG. 1, when threaded bore 8 is screwed onto threaded portion 4, stake 7 is disposed completely within hollow bore 6 of the rod handle. To remove the stake from this stored position to the position of use, it is merely necessary to unscrew mounting member 5 from threaded portion 4, reverse the mounting member, and screw it onto threaded portion 4 by threaded bore 9. Stake 7 will then be axially extended from the rod handle, and can be inserted in the ground to support the apparatus, as illustrated in FIG. 4.

Figure 3:
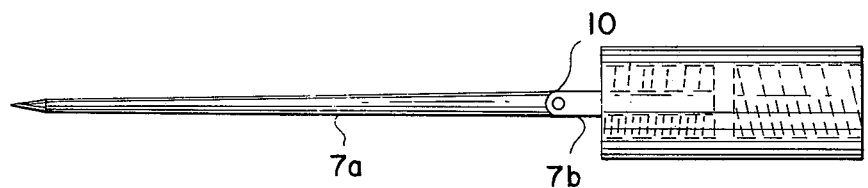
FIG. 3 shows a stake and its mounting member, the stake incorporating the optional feature of a pivot joint.
Figure 5:
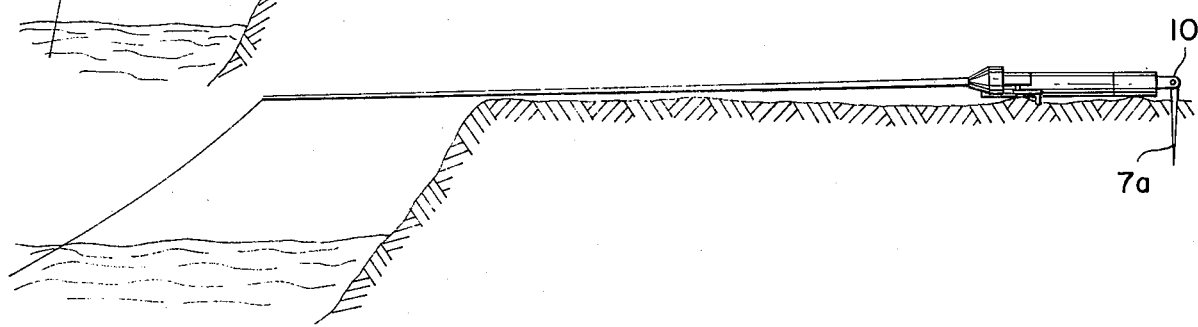
FIG. 5 shows a reel and rod lying on the ground, and anchored by the pivoted stake of FIG. 3.

As shown in FIG. 3, stake 7 can include a pivot joint 10 dividing the stake into a pointed section 7a and a base section 7b which can be oriented relative to each other at any desired angle. As shown in FIG. 5, pointed end 7a can be oriented at 90° to base end 7b so as to serve as an anchor for the rod when lying on the ground. The pivot joint can be of any of numerous forms, and may include a pivot pin in the form of a bolt cooperating with a nut to permit loosening and tightening of the joint so that it can be set in any desired angular setting. However, normally members 7a and 7b will either be aligned with each other as in FIG. 3, or at 90° to each other as in FIG. 5. The details of pivot joint 10 do not constitute an essential part of the invention, and hence the joint does not illustrate it in extensive detail. The pivot joint is, of course, an optional feature of the invention.

It will be clear that it is almost impossible to forget the spike of my invention. In use, it is integral with the rod handle, and when packing up, the fisherman would simply unscrew it from the position shown in FIG. 4, and return it to the position shown in FIG. 1.

While I prefer and have illustrated screw threads for coupling members 5 and 4, it will be understood that other forms of coupling joints could be used, such as smooth male and female friction couplings, set screw couplings, etc. If desired, a cap, threaded or not, could be provided to close the end of bore 9 when in the position of FIG. 1. Of course, where threaded couplings are used, it will be understood that the base end of handle 2 could be formed with interior threads, with mounting member 5 formed with corresponding exterior threads. Also, while I have illustrated my storable rod stake as forming an integral part of a rod handle, it will be understood that the invention could be sold in kit form for mounting on a conventional rod handle. In such form, the kit preferably would comprise a cylindrical member having a hollow bore, formed at one end so as to be mountable axially on the free end of a conventional rod handle, and formed at its other end with a threaded portion such as at 4, coupled with a mounting member 5, stake 7, etc. As such, the kit would form a mountable extension for a conventional rod handle. Various other adaptations, modifications and the like will be apparent to those skilled in the art, and accordingly it should be understood that I have illustrated herein only the presently preferred embodiment of my invention, that this is not limiting of the invention, and that the scope of the invention is as defined in the subjoined claim, construed in the light of the foregoing specification and drawing.

Having thus described a preferred embodiment of my invention as required by the statute, I claim:

1. A fishing rod with a storable rod stake formed and arranged to constitute a continuation of the rod handle, comprising a fishing rod having a rod section and an elongate handle, said handle being coupled to said rod section at one end and having a free end, a hollow bore formed in said handle and extending from said free end toward said one end, a one-piece unit comprising an elongate rod stake having a pointed end and a base end and mounting means coupled to said base end and formed with axially opposite coupling means for detachable coupling with the free end of said elongate handle, such that said mounting means can be coupled to the free end of said handle to constitute an integral part of the handle with said stake extending into and stored in said hollow bore, or with said stake extending from the free end of said handle so as to be insertable into the ground, said free end of said handle including a screw threaded portion on its periphery, and said axially opposite coupling means comprising threaded portions on said mounting means for screw engagement with said threaded portion of said handle, said threaded portions of said mounting means comprising interiorly threaded, axially opposite bores opening from opposite ends of said mounting means, said stake passing into one of said threaded bores and being fixed at its base end to the inner end of said one bore, but being spaced radially inwardly of the threads of said one bore, said stake including a pivot joint between its pointed end and said mounting means to permit selective pivoting of the pointed end to a desired angle relative to the stake portion on the other side of said pivot joint so as to permit ready variation of the angle between the pointed end portion and the stake portion on the other side of said pivot joint, and hence between the pointed end portion and the fishing rod.

* * * * *